Oct. 5, 1926. 1,602,149
C. B. EVANS
RESILIENT WHEEL
Filed Sept. 11, 1923 2 Sheets-Sheet 1
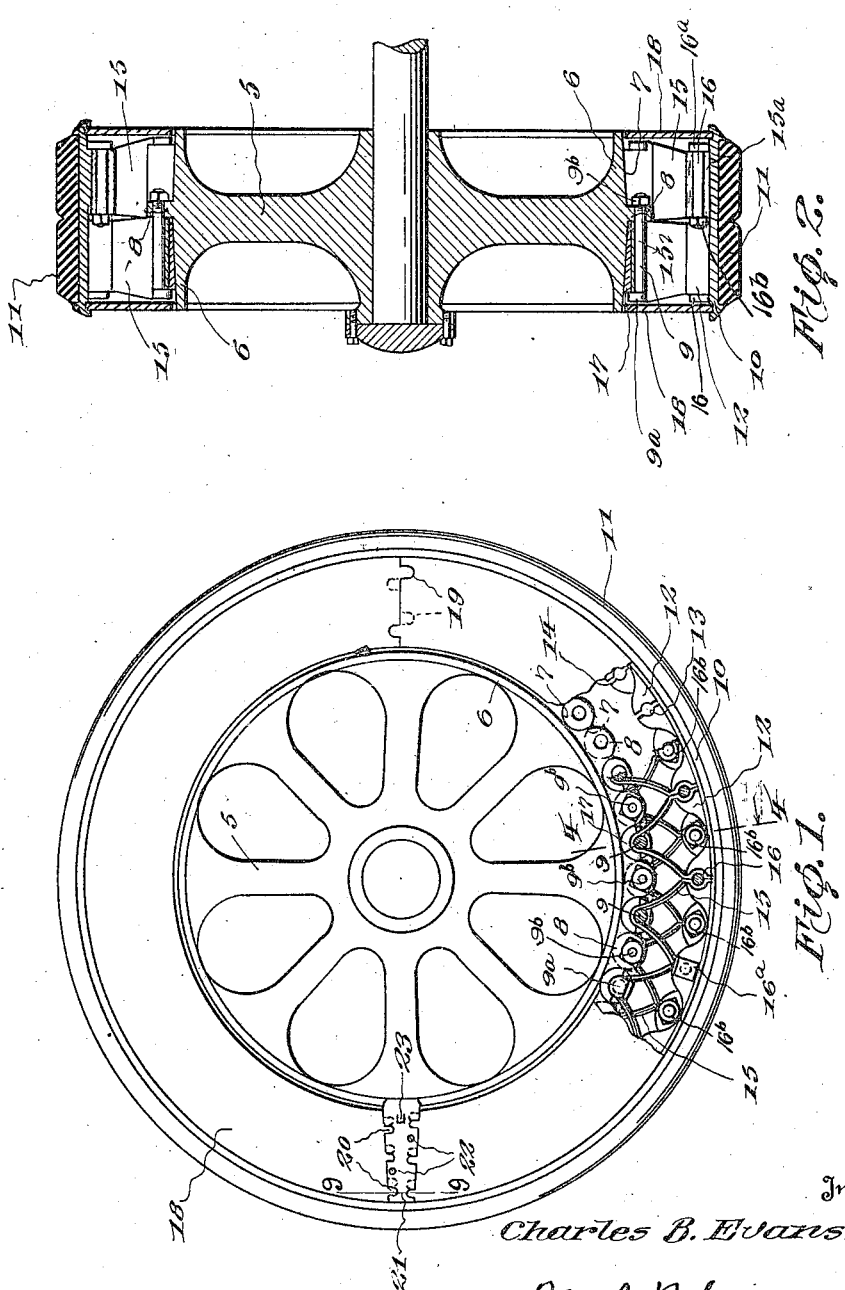
Inventor:
Charles B. Evans.
By Milo B. Stevens & Co.
Attorneys.

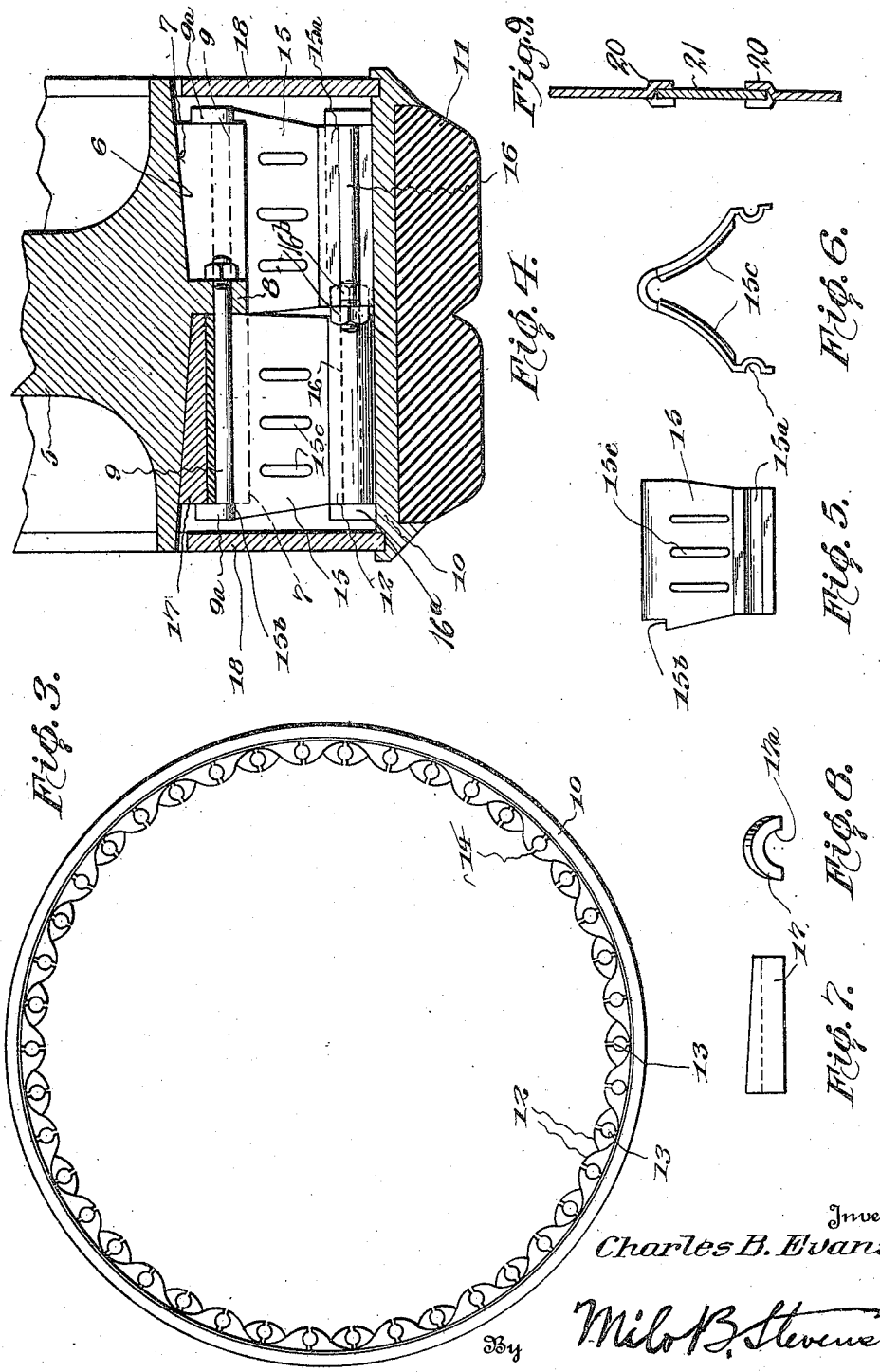

Patented Oct. 5, 1926.

1,602,149

UNITED STATES PATENT OFFICE.

CHARLES B. EVANS, OF CHICAGO, ILLINOIS.

RESILIENT WHEEL.

Application filed September 11, 1923. Serial No. 662,141.

My invention relates generally to resilient wheels and more particularly to an improved wheel of this character which is especially applicable to automobiles and other motor vehicles for obviating the necessity of the usual pneumatic tires.

An important object of the invention is the provision of a wheel of the kind stated wherein the various spring elements will be readily accessible for independent replacement.

As a still further object, the invention aims to furnish in connection with a wheel of this species, an improved means for isolating the spring elements from dirt etc., the same being applicable without necessitating the use of bolts, screws or similar fasteners.

The invention further contemplates a wheel which will be strong and durable in construction, highly efficient in practical use and relatively inexpensive of manufacture.

With the above principal and other incidental objects in view, the invention comprises certain novel features of construction and arrangement of the various constituent elements to be hereinafter described and claimed and in order that the same may be better understood reference is made to the accompanying drawings forming a part of the specification, wherein the preferred embodiment of the invention is disclosed.

In the drawings,

Fig. 1 is a side elevation, partly broken away and partly in section to illustrate the application and construction of the spring elements;

Fig. 2 is a vertical transverse sectional view;

Fig. 3 is a side elevation of the rim removed;

Fig. 4 is an enlarged cross sectional view of the felly and rim construction illustrating the spring elements and their attaching means; the same being taken on the line 4—4 of Fig. 1.

Fig. 5 is a detail in side elevation of one of the springs;

Fig. 6 is an end view thereof;

Fig. 7 is a detail in side elevation of one of the spring tension devices or wedges;

Fig. 8 is an end view thereof, and

Fig. 9 is a sectional detail on the line 9—9 of Fig. 1.

Referring specifically to the drawings, wherein like reference characters have been used to designate similar parts throughout, numeral 5 indicates the wheel body having a felly 6, the outer periphery of which is provided with two circular series of transversely disposed arcuate surface recesses 7 opening from either edge and decreasing in depth toward the medial peripheral portion of the felly where they terminate. The corresponding recesses of one series are disposed in staggered relation to those of the other and at each of the inner extremities thereof the felly is formed with an integral lug or ear 8 which is transversely apertured for the reception of a bolt 9, the function of which will be presently apparent.

The rim, denoted generally at 10 carries a rubber tire 11 which may be secured thereon in any preferred manner. The inner periphery of the rim is formed upon either side of its medial portion with a series of integral transverse lugs 12 having central bores 13, communication being had thereto through transverse slots 14 which latter extend inwardly beyond the bores 13 as clearly shown in Fig. 3, the purpose of which will be presently apparent. It might here be stated that the lugs 12 of one series are arranged in staggered relation to those of the other as best shown in Figs. 1 and 3.

It will be noted that the wedge shaped arcuate recesses 7 of the felly at either side of the medial portion thereof are diametrically opposite the series of lugs 12 on the inner periphery of the rim, and lie in a plane intermediate adjacent ones of said lugs 12. The rim 10 is attached to the felly for vertical yielding movement towards the same by means of arched springs 15, the formation of which will be better understood upon reference to Figs. 5 and 6. Adjacent the outer edge portions of the springs, are formed transverse semi-circular bearing portions 15ᵃ co-extensive with the width of the springs and open at either end. These portions of the adjacent springs 15 when inserted from the outside into the bores 13 of the lugs 12 form bearing recesses for bolts 16 whereby the springs will be effectually held in engagement with the rim 10 as clearly shown in Fig. 1. The slots 14 in the lugs permit the arched portions of the springs to extend therethrough. The inner curved portions of the springs extend into the diametrically opposite recesses 7 of the felly, and in order to place the springs under a predetermined amount of compression to prevent any looseness thereof, wedges 17 are provided of arcuate cross section, these being insertible into the recesses of the felly from the outside thereof. Since the recesses 7 of the felly decrease in depth towards the medial portion of the felly, insertion of the wedges 17 therein will place the springs 15 under suitable compression. If after the springs have been in use over a long period of time they tend to sag, wedges 17 of larger size may be employed to take up any looseness. It will be noted upon reference to Fig. 5 that the outer edge of each of the springs 15 adjacent the curved apex thereof is formed with a notch $15^b$ which latter is adapted to receive the flat edge portion of the head $9^a$ of the bolt 9 referred to hereinbefore. Thus upon fully inserting the wedge 17 and tightening the nut $9^b$ on said bolt the flat edge of the head engaging in the notch $15^b$ will prevent rotation thereof and the spring will be securely clamped in position with its inner edge against the lug or ear 8. This bolt head $9^a$ is also designed to engage the outer end of the wedge 17 to hold it inserted in the recess 7. The recess $17^a$ of the wedge receives the inner curved portion of the spring 15 to prevent dislodgment of the same.

The heads $16^a$ of the bolts 16 are formed similarly to the bolts 9 in that they have a flat edge adapted to seat against the inner periphery of the rim 10. Thus, upon tightening the nuts $16^b$ rotation of the bolts will be prevented and the semi-circular bearing portions $15^a$ of adjacent springs will be firmly held in place.

Upon reference to Figs. 2 and 4 it will be noted that the rim 10 is formed adjacent either edge with an inner circumferential groove for the reception of the arcuate halves or segments 18 of a dust and mud guard which, when assembled is of ring-like contour, its inner periphery being spaced from the adjacent portion of the felly 6 to allow for the yielding action of the springs 15. Each of the mud guard segments, at one meeting point is provided with a plurality of tongues 19 alternate ones of which are bent slightly in opposite directions for guiding the meeting edges to contact where they will be retained by means of the action of a wedge 21 which will now be described in connection with the other joint of the segments.

The other ends of the segments 18 are likewise provided with tongues 20 bent in a manner similar to the tongues 19 to constitute guides for the wedge 21 and it should here be stated that these last-mentioned ends of the segments 18 are cut angularly so that the space therebetween will be wedge-like, decreasing in width toward the outer edges of the segments, as clearly shown in Fig. 1. The wedge engages the angular edges of the guard segments 18 to separate the same and increase the diametric dimension of the assembled sections 18, this action resulting in the tight seating of the mud guard in the edge grooves of the rim, and without necessitating the employment of screws of analogous fasteners in direct contact with the rim. As a means for retaining the wedge in position I prefer to use screws 22 which are threaded therethrough in advance of the fingers 20 and adjacent the same. A finger 23 may be struck up from the wedge as a means for facilitating removal thereof.

From the foregoing description, read in connection with the accompanying drawings, the structural details and advantages thereof will be readily apparent to those skilled in the art. The rigid attachment of the springs 15 to both felly and rim effectually prevents any side sway without, however affecting the vertical yielding movement of the same relative to each other. The staggered arrangement of the springs tends toward an even distribution of the strain during the rotary movement so that at no time is the weight supported by but one spring. Access may be readily had to the springs by merely removing the wedge 21 to free the mud guard segments 18, and attention is here called to the fact that the staggered arrangement of the ears 8 and lugs 12 permits the convenient application of a socket or speed wrench to the nuts of the respective bolts thereof. Removal and replacement of a spring can thus be readily accomplished.

In the event of weakening of the springs 15, the dust guard will contact with the adjacent portion of the felly 6 to support the rim and prevent any material bumping or jarring which might otherwise occur in the event of the breaking or weakening of a number of successive or proximately located springs.

Ribs $15^c$ tend to strengthen the springs and are especially desirable when applied to wheels for trucks or heavy vehicles.

The wheel while indicated as being especially adapted for motor vehicles may, with equal facility, be employed in connection with railway cars by merely substituting the flanged rim of a railway wheel for the motor vehicle rim 10 illustrated herein.

The embodiment of the invention herein has been described and illustrated in accordance with the patent statutes, but it will be distinctly understood that I do not propose to limit myself strictly thereto, since various changes and modifications will immediately suggest themselves to those skilled in the art without departing from the spirit of my invention, the scope of which is defined by the following claims.

What I claim as new and desire to secure by Letters Patent is:

1. A spring wheel comprising spaced felly and rim sections, a series of circumferentially (arranged spring elements, retaining means therefor carried by said felly and rim, and said retaining means including transversely movable wedge means for compressing said springs and means for holding said wedge means in effective position.

2. A spring wheel comprising spaced felly and rim portions, vertically yieldable cushioning elements interposed between said felly and rim, means for preventing relative lateral movement of said rim and felly, an annular guard plate carried by said rim and extending toward said felly in spaced relation thereto, and means for expanding the diametric dimensions of said plate for frictionally engaging the same with said rim.

3. A spring wheel comprising spaced felly and rim portions, vertically yieldable cushioning elements interposed between said felly and rim and comprising a primary support for said felly, annular guard plates removably carried by said rim at each side thereof and extending toward said felly in spaced relation thereto, means for increasing the diametric dimensions of said plates for frictionally engaging the same with said rim, and said plates constituting a secondary support for said felly in the event of the breaking or weakening of a number of adjacent springs or when the wheel is subjected to an unusually heavy load.

4. A spring wheel comprising spaced felly and rim portions, one of said portions having a plurality of surface recesses therein, circumferential series of staggeredly arranged spring elements disposed between said felly and rim portions and independently and freely insertible from opposite sides thereof, each of said spring elements having one end alined with one of said recesses, and radially acting means positionable in said recesses for compressing said springs to maintain an intimate connection between said felly and rim.

5. A spring wheel comprising spaced felly and rim portions, vertically yieldable cushioning elements interposed between said felly and rim, an annular guard plate carried by said rim and extending toward said felly in spaced relation thereto, said plate having a transverse split, wedge means insertible between the edges of said split for increasing the diametric dimensions of said plate for frictionally attaching the same to said rim, and retaining means for said wedge means.

6. The combination specified in claim 5 including guide fingers carried by the plate adjacent said split portion for defining the path of movement of said wedge means.

7. A spring wheel comprising spaced felly and rim sections, a circumferential series of transversely disposed longitudinally bored spring retaining bosses carried by said rim at each side of the inner periphery thereof, said bosses having transverse slots communicating with the bores, the respective bosses of one series being staggered with respect to those of the other, a series of arched springs carried by each series of bosses and interposed between said rim and felly, said springs having transverse arcuate portions adjacent their ends, the opposed arcuate portion of each adjacent spring being insertible in the bore of one of said bosses, the springs extending through said slots and radially inward therefrom, means for retaining said springs in said bosses, retaining means carried by said felly for connecting the springs thereto, and means engaged by said retaining means for compressing said springs and holding the same in intimate contact with said felly.

In testimony whereof I affix my signature.

CHARLES B. EVANS.